United States Patent
Thies geb. Behrendt et al.

(10) Patent No.: US 12,247,868 B2
(45) Date of Patent: Mar. 11, 2025

(54) METHOD FOR PROVIDING A CURRENT BRIGHTNESS VALUE RELATING TO AN AMBIENT BRIGHTNESS, DETECTION DEVICE AND MOTOR VEHICLE

(71) Applicant: Volkswagen Aktiengesellschaft, Wolfsburg (DE)

(72) Inventors: Ramona Thies geb. Behrendt, Braunschweig (DE); Arno Brosig, Braunschweig (DE); Frank Oberst, Salzwedel (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 79 days.

(21) Appl. No.: 18/252,520

(22) PCT Filed: Nov. 11, 2021

(86) PCT No.: PCT/EP2021/081326
§ 371 (c)(1),
(2) Date: May 10, 2023

(87) PCT Pub. No.: WO2022/101314
PCT Pub. Date: May 19, 2022

(65) Prior Publication Data
US 2024/0019298 A1    Jan. 18, 2024

(30) Foreign Application Priority Data
Nov. 12, 2020 (DE) .......................... 102020214271.8

(51) Int. Cl.
*G01J 1/42* (2006.01)
*B60Q 9/00* (2006.01)

(52) U.S. Cl.
CPC .............. *G01J 1/4204* (2013.01); *B60Q 9/00* (2013.01)

(58) Field of Classification Search
CPC ................................. G01J 1/4204; B60Q 9/00
See application file for complete search history.

(56) References Cited

U.S. PATENT DOCUMENTS

| 4,580,875 A | 4/1986 | Bechtel et al. |
| 7,402,786 B2 * | 7/2008 | Schofield ................ G01J 3/513 |
| | | 250/208.1 |

FOREIGN PATENT DOCUMENTS

| CN | 111263489 A | 6/2020 |
| DE | 3511167 A1 | 10/1985 |

(Continued)

OTHER PUBLICATIONS

PCT/EP2021/081326. International Search Report (Mar. 7, 2022).
Priority Appln. No. DE102020214271.8. Office Action (Aug. 5, 2021).

*Primary Examiner* — Kevin K Pyo
(74) *Attorney, Agent, or Firm* — Peter Zura; LOZA & LOZA, LLP (57) ABSTRACT

Technologies and techniques for providing a current brightness value relating to an ambient brightness, wherein at least one first raw brightness value and temporally thereafter at least one second raw brightness value are detected using at least one brightness sensor. An averaging may be carried out at least for the at least one second raw brightness value together with at least the at least one first raw brightness value, and a result of the averaging being provided as a current mean brightness value. A gradient limitation is carried out for the current mean brightness value, in which a deviation of the current mean brightness value from at least one previously provided brightness value is limited to at least one maximum permissible amount if the deviation of the current brightness mean value from the at least one previously provided brightness value is greater than the at least one maximum permissible amount.

20 Claims, 2 Drawing Sheets

(56) References Cited

FOREIGN PATENT DOCUMENTS

| | | |
|---|---:|---:|
| DE | 19922687 A1 | 11/2000 |
| DE | 19957210 A1 | 5/2001 |
| DE | 10163356 A1 | 7/2003 |
| DE | 102004022581 A1 | 4/2005 |
| DE | 102005031313 A1 | 1/2007 |
| DE | 102008002505 A1 | 12/2009 |
| DE | 102011002572 A1 | 7/2012 |
| DE | 102012024706 A1 | 6/2013 |
| DE | 102013221188 A1 | 4/2015 |
| DE | 102016005738 A1 | 10/2017 |
| EP | 0151286 A2 | 8/1985 |
| EP | 0285724 A2 | 10/1988 |
| EP | 0286401 A2 | 10/1988 |
| EP | 2674326 A2 | 12/2013 |
| WO | 9419212 A2 | 9/1994 |

\* cited by examiner

METHOD FOR PROVIDING A CURRENT BRIGHTNESS VALUE RELATING TO AN AMBIENT BRIGHTNESS, DETECTION DEVICE AND MOTOR VEHICLE

RELATED APPLICATIONS

The present application claims priority to international Patent Application No. PCT/EP2021/081326 to Behrendt, et al., titled "Method For Providing A Current Brightness Value Relating To An Ambient Brightness, Detection Device And Motor Vehicle", filed Nov. 11, 2021, which claims priority to German Patent App. No. DE 10 2020 214 271.8, filed Nov. 12, 2020, the contents of each being incorporated by reference in their entirety herein.

FIELD OF TECHNOLOGY

The present disclosure relates to technologies and techniques for providing a current brightness value relating to an ambient brightness, at least one first raw brightness value and temporally thereafter at least one second raw brightness value being detected using a brightness sensor, an averaging being carried out at least for the at least one second raw brightness value together with at least the at least one first raw brightness value, and a result of the averaging being provided as a current mean brightness value. The present disclosure also relates to a corresponding detection device for a motor vehicle and a motor vehicle having such a detection device.

BACKGROUND

A current ambient brightness is often used to control various vehicle functions. The current ambient brightness is used primarily when controlling headlights or glare-free rear-view mirrors. However, the measured brightness is subject to strong fluctuations, some of which can be very short-lived, for example when driving along an avenue. Since the headlights should not be switched on and then off again immediately every time the car drives past a tree, it is common to first average the brightness values detected by a brightness sensor, namely the raw brightness values, before they are fed to downstream processes. In particular, there are various known methods for averaging raw brightness values.

For example, DE 35 11 167 A1 describes an electronic controller for automatic motor vehicle rear-view mirrors. Such a rear-view mirror switches from a fully reflective state to a partially reflective state in the event of glare from behind. The ambient brightness in front of the vehicle is compared to that behind it in order to determine the switching threshold, a long-term average of the ambient brightness in front of the vehicle being applied as well as a short-term average of the glare brightness.

DE 199 57 210 A1 further describes a method and a device for automatically switching the lights of a vehicle on and/or off in which incorrect switching is reduced by adapting the threshold value for switching on the lights, the adapting being accomplished by, among other things, averaging the measured brightness value or values as a function of driving speed and by using switching-off conditions that take into account the ambient brightness. In particular, the averaging can be carried out as an exponential smoothing which also takes into account the vehicle speed as a weighting factor.

DE 101 63 356 A1 further describes a method and a device for automatically activating a lighting device of a vehicle, it being possible to smooth the signal from a brightness sensor in order to activate a headlight. Two smoothing units are provided for this purpose, the units differing in their attenuation and thus providing a more or less rapid adaptation of the smoothed signal to the ambient brightness. Under good light conditions, i.e., high brightness, a high attenuation is selected, and under poor light conditions, a weak attenuation is selected.

The effect of different situations on the detected brightness values can be taken into account in the different averaging methods. Nevertheless, it would be desirable to be able to further improve such an adaptation to the situation, in particular to provide improved application-specific adaptation options.

SUMMARY

Aspects of the present disclosure are therefore to provide technologies and techniques for providing a current brightness value relating to an ambient brightness, a detection device and a motor vehicle which allow the best possible adaptation, at least for specific applications, when providing a current brightness value. Some aspects may be achieved by a method, by a detection device and by a motor vehicle having the features according to the respective independent patent claims. Advantageous embodiments of the present disclosure are the subject matter of the dependent patent claims, the description, and the figures.

In some examples, a method is disclosed for providing a current brightness value relating to an ambient brightness, at least one first raw brightness value and temporally thereafter at least one second raw brightness value are detected using a brightness sensor, wherein an averaging is carried out at least for the at least one second raw brightness value together with at least the at least one first raw brightness value, and a result of the averaging is provided as a current mean brightness value. Furthermore, a gradient limitation is carried out for each current mean brightness value according to which a deviation of the current mean brightness value from at least one previously provided brightness value is limited to at least one maximum permissible amount if the deviation of the current mean brightness value from the at least one previously provided brightness value is greater than the maximum amount permitted. A result of the gradient limitation is then provided as the current brightness value. In particular, a signal can be provided and/or output as a function of the provided current brightness value, for example to a further function module of the motor vehicle.

In addition to an averaging, another gradient limitation may be carried out according to some aspects, which consequently allows an additional possibility of adaptation. With such a gradient limitation, it can advantageously be achieved that the current brightness values provided in this way, which can be provided by repeated execution of the method in successive time steps, follow slow changes in the ambient brightness very well, whereas the adaptation to strong brightness changes in the ambient brightness using the current brightness values so provided is slowed down by the gradient limitation defined above. For example, if a current mean brightness value is provided as a result of the averaging mentioned above and if it deviates from a previously provided current brightness value by more than the maximum permissible amount, it is not this current mean brightness value that is set equal to the new current brightness value, but rather a modified mean brightness value, for example a reduced mean brightness value in the case where the deviation is positive, whose deviation from the previous brightness value is the maximum permissible amount. A deviation is to be understood as the amount of the difference between the current mean brightness value and the at least one brightness value previously provided.

In some examples, a detection device is disclosed for a motor vehicle, configured to provide a brightness value relating to ambient brightness, the detection device having at least one brightness sensor designed to detect at least one first raw brightness value and temporally thereafter at least one second raw brightness value, the detection device also having an evaluation unit which is designed to carry out an averaging, at least for the at least one second raw brightness value together with at least the at least one first raw brightness value, and to provide a result of the averaging as a current mean brightness value. Furthermore, the evaluation unit may be configured to carry out a gradient limitation for the current mean brightness value according to which a deviation of the current mean brightness value from at least one previously provided brightness value is limited to at least one maximum permissible amount, for example, if the deviation of the current mean brightness value from the at least one previously provided brightness value is greater than the at least one maximum permissible amount. Furthermore, the evaluation unit may be configured to provide a result of the gradient limitation as the current brightness value, for example in the form of a signal which is dependent on the current brightness value, in particular in the form of a signal representing the current brightness value.

The advantages mentioned for the method according to the present disclosure and its embodiments apply in the same way to the detection device. In addition, the method steps mentioned in connection with the method and its embodiments enable the further development of the detection device according to the present disclosure through further corresponding physical features.

In some examples, a motor vehicle is disclosed, comprising a detection device according to the present disclosure and one or more of its embodiments. Here, too, the advantages mentioned in connection with the method according to the invention and its embodiments apply in the same way to the motor vehicle according to the present disclosure.

Aspects of the present disclosure also include the combinations of features of the described embodiments.

BRIEF DESCRIPTION OF THE DRAWINGS

Exemplary embodiments of the invention are described below. The following figures show.

DETAILED DESCRIPTION

The exemplary embodiments explained below are preferred exemplary embodiments of the invention. In the exemplary embodiments, the components described each represent individual features of the invention to be considered independently of one another, each of which also develops the invention independently of the others and all of which are therefore also to be regarded as part of the invention individually or in a combination other than that shown. Furthermore, the exemplary embodiments described can also be supplemented by further features of the invention that have already been described.

Elements with the same function are each provided with the same reference signs in the figures.

Aspects of the present disclosure are based on the finding that gradient limitations are suitable for distinguishing between day and night on the basis of the current brightness values, and in particular for representing the actual daytime brightness during the day and not confusing it with driving situations such as driving through tunnels or crossing bridges. In particular, this method allows such driving situations to be differentiated from a day/night change and filtered out. This is due to the fact that brightness fluctuations caused by the change between day and night occur very slowly and in small steps compared to all other traffic situations that involve a significant change in the ambient brightness. For example, when driving into a tunnel, the ambient brightness typically changes abruptly from bright to dark and the change in ambient brightness is correspondingly large, which can be filtered by the gradient limitation. The current brightness values provided according to the present disclosure can therefore represent the day/night profile very well, while the influence of other traffic situations on the current brightness values provided in this way can be greatly reduced.

Aspects of the present disclosure are based on the further finding that there are motor vehicle systems, in particular driver assistance systems, which benefit greatly from current brightness values provided in this way, such as the drowsiness detection system described in more detail below. Since the drowsiness of a driver depends more on whether it is day or night and less on whether the driver is driving through a tunnel or a bridge, it is particularly advantageous to use a current brightness value as can be provided according to a method according to the invention as an indicator for the detection of driver drowsiness. In contrast to the control of headlights or glare-free rear-view mirrors, the current brightness value, which is used for example to detect drowsiness, is not intended to take account of temporary traffic and driving situations that involve a change in the ambient brightness. The extent to which such traffic situations are now to be filtered out can also advantageously be set by suitably calculating the maximum permissible amount. Using the technologies and techniques disclosed herein, many other advantageous additional adaptation options are possible by providing a current brightness value derived from the at least one first and second raw brightness value, or by repeatedly providing current brightness values from raw brightness values in respective time steps.

In some examples, the first raw brightness value can, but does not necessarily have to, represent the raw brightness value detected first in time. For example, it can also represent a brightness raw value detected at any later time. The raw brightness value detected first in time, i.e., when no other raw brightness values have been detected previously, can be set equal to the current mean brightness value and can also be set equal to the current brightness value. In addition, it is preferred that the method is carried out repeatedly in respective successive time steps, the current brightness value provided in the current, in particular in a first, time step being set equal to the previously provided brightness value in a subsequent, in particular a second time step.

If the method is executed repeatedly in respective successive time steps, the result, for example, is a method for providing a current brightness value relating to an ambient brightness in which current raw brightness values including the at least one first and second raw brightness value are repeatedly detected using at least one brightness sensor, an averaging being carried out for each current raw brightness value detected, and a result of the averaging being provided as the current mean brightness value. Furthermore, a gradient limitation is carried out for each current mean brightness value according to which a deviation of the current mean brightness value from at least one previously provided brightness value is limited to at least one maximum permissible amount if the deviation of the current mean brightness value from the at least one previously provided brightness value is greater than the maximum amount permitted. A result of the respective gradient limitation is then provided as the current brightness value for a respective time step.

Any light sensor known from the prior art, in particular a photodetector, optical detector or optoelectronic sensor, can be used as the brightness sensor. Examples of such light sensors include photocells, photomultiplayers, photodiodes, phototransistors, photoresistors, CMOS sensors or CCD sensors. Such a light sensor can be arranged on the outside of the motor vehicle and/or also in the vehicle interior, in which case preferably in the area of a window or a windshield. Several such light sensors can also be used. Their respective raw brightness values can then be averaged for a respective time step, for example, in order to first provide an averaged raw brightness value which can be the starting point of the method described, the starting point being relative to the current raw brightness values, i.e., the at least one first and at least one second raw brightness value. However, a camera of the motor vehicle can also be used as a brightness sensor, in particular a camera for detecting the surroundings, the camera similarly being arranged on the outside of the motor vehicle or in the vehicle interior near a window or a windshield, for example on the rear-view mirror, of the motor vehicle so that it at least can detect part of the environment of the motor vehicle. For example, the brightness values of the individual pixels of the camera can be averaged per time step, which is to say per image recording, as a result of which a corresponding raw brightness value is provided.

Again, several cameras can be used analogously in order to provide, by appropriate averaging per time step, the current raw brightness value as a starting point for the method described. Then, for each newly detected and thus currently detected raw brightness value, an averaging is carried out first, for which purpose a method known from the prior art can be used, for example. The raw brightness value provided by the at least one brightness sensor can correspondingly already represent an averaged raw brightness value. Furthermore, a repeated detection of such current raw brightness values can be understood to mean that such a detection preferably takes place at defined points in time and furthermore preferably at equal or constant time intervals. A detection therefore takes place in respective successive time steps. For such a time step, a new, i.e., current, raw brightness value is provided, an averaging is carried out on the basis of this raw brightness value and then the gradient limitation mentioned is carried out, whereby a new, i.e., current, brightness value corresponding to this time step is provided. This process is preferably repeated for each time step.

In a particularly advantageous embodiment of the invention, the gradient limitation is implemented as an asymmetric gradient limitation according to which the deviation of the current mean brightness value from the at least one previously provided brightness value is limited to a first maximum permissible amount if the current mean brightness value is greater than the at least one previously provided brightness value, and the deviation of the current mean brightness value from the at least one previously provided brightness value is limited to a second maximum permissible amount if the current mean brightness value is less than the at least one previously provided brightness value, the first amount differing from the second amount.

As a result, it can be accomplished more advantageously that the current brightness values are adapted to the ambient brightness at different speeds depending on whether the ambient brightness is increasing or decreasing. This is based on the knowledge that the decrease in ambient brightness is often associated with the occurrence of a specific traffic situation, such as driving into a tunnel, which means that the measured brightness no longer corresponds to the natural daytime-related brightness. Conversely, increasing ambient brightness is usually related to the cessation of a specific traffic event or traffic situation, such as driving out of the tunnel, so that in this situation the measured raw brightness values, i.e., the at least one first and the at least one second raw brightness value, correspond significantly better to the ambient brightness which is due to the time of day. As a result of the asymmetric gradient limitation mentioned above, it is now advantageously possible for adaptation to a traffic situation-induced change in ambient brightness to take place very slowly, whereas adaptation to the "natural" ambient brightness can take place more quickly when this traffic situation ceases. This makes it possible to provide current brightness values which, even when such traffic situations occur, still very well represent the "natural," i.e., daytime-related average ambient brightness, which in turn is particularly relevant for the drowsiness detection system described above.

Accordingly, it may be particularly advantageous when the first amount is greater than the second amount. Thus, a change in the direction of decreasing brightness is more gradient-limited than changes in the direction of increasing brightness. In other words, in this way current brightness values can be provided which cause an increase to a brighter environment to be undertaken more quickly than a decrease to a darker environment. As a result, the influences of driving through tunnels or over bridges or other similar traffic scenarios can advantageously be filtered out much more effectively.

Furthermore, it is preferred that the at least one brightness value provided previously represents the last brightness value provided. In the case of the above-described deviation of the current mean brightness value, reference is therefore always made to the current brightness value provided immediately prior in the time step. It is precisely the comparison to the immediately preceding brightness value that contains information about how much the current environmental and traffic situations are changing. It is precisely the short-term changes in the situation that should be filtered out, which is why the reference to the immediately preceding brightness value is particularly advantageous.

In some examples, the averaging may be carried out as a weighted averaging. Fluctuations can advantageously be smoothed out by such an averaging. This is particularly advantageous in the case of extremely short-term fluctuations, such as when driving along an avenue. Fluctuations that are due to measurement tolerances can also be eliminated or at least smoothed out in this way. With such an averaging, the previously detected first raw brightness value does not necessarily have to be included directly, but can also be taken into account indirectly, for example by performing the averaging as a function of a previously provided mean brightness value in which the at least one first raw brightness value was included, or as a function of the previously provided current brightness value in which the at least one first raw brightness value was included. In this case, it is particularly advantageous to carry out such an averaging as a weighted averaging since such a weighting factor provides a further advantageous adaptation possibility.

Such a weighting factor accordingly determines to what extent a previously detected or provided value, i.e., the at least one first raw brightness value, the last provided mean brightness value or the last provided brightness value, influences the current mean brightness value. Strong weighting of previously detected or provided values can result in strong attenuation or strong smoothing, whereas correspondingly weaker attenuation or weaker smoothing can be achieved with low weighting. In the present case, stronger weighting in favor of the currently detected second raw brightness value is advantageous, since excessive smoothing due to the averaging reduces the effects of the subsequent gradient limitation. In contrast, stronger weighting in favor of the currently detected second raw brightness value makes the subsequent gradient limitation more effective, which in turn improves the filtering out of influences of specific traffic situations.

In some examples, the averaging may be carried out as an exponential smoothing. In this case, the at least one second raw brightness value is averaged in weighted fashion together with the brightness value provided immediately beforehand. Here, too, the weighting factor can be suitably selected as described above. Exponential smoothing represents a particularly advantageous and simple way of smoothing the raw brightness values.

In some examples, at least one motor vehicle function may be controlled on the basis of the provided current brightness value, in particular a motor vehicle function other than a headlight function of a headlight of the motor vehicle, and also preferably a motor vehicle function other than an adjusting of a glare-free rear-view mirror. As already described above, it may be particularly advantageous to use the current brightness value determined in this way to control motor vehicle functions, in particular those in which knowledge of the current time of day, which can thus be derived from the brightness value currently provided, brings added value. In other words, in this case the motor vehicle functions to be controlled are those for which it makes a difference whether it is day or night, but for which it makes no difference whether the motor vehicle is driving through a tunnel or under a bridge or not. This method is also advantageous for motor vehicle and assistance functions in which knowledge of the actual daytime brightness is relevant, regardless of driving situations which cause an "artificial" change in brightness. However, this does not apply to headlight functions, since a headlight should also be switched on when the motor vehicle is driving through a tunnel or a larger bridge, as well as at night.

In some examples, the at least one motor vehicle function may represent a drowsiness detection system. In this case, a current variable describing a drowsiness of the driver of the motor vehicle can be determined as a function of the current brightness value and a warning can be issued to the driver as a function of the current variable. If, based on the current variable that describes the driver's drowsiness, it is determined that the driver is currently tired, for example if a specific threshold value for this variable is exceeded, the driver can be made aware of and warned about this by issuing the warning. Such a warning can be output in optical, acoustic, or haptic form.

In addition to the current brightness, which is represented by the current brightness value, other parameters can also be included in the current variable for the driver's drowsiness, for example the driving time so far and/or the monotony of the driving situation or the like. Because providing the current brightness value makes it possible to filter out the influence of driving situations, such as driving through a tunnel, false triggering of the drowsiness detection system occurs much less frequently. This variable describing the driver's current drowsiness can, for example, represent a numerical value provided according to a predetermined metric, the numerical value representing the extent of the driver's drowsiness, for example in the form of a drowsiness level.

However, other motor vehicle functions can also be controlled as a function of the current brightness value determined or provided in this way. For example, a traffic sign recognition system can also use the current brightness value to help determine whether or not certain speed limits are currently valid, for example those that only apply at night. Here, too, the focus is on the day-night difference, for example, whereas traffic and driving situations such as driving through tunnels are irrelevant. Another example of a vehicle function would be switching on special night-time ambient lights, according to which displays, such as the instrument cluster in the vehicle, can be illuminated differently at night than during the day to make it easier to read, to save energy or the like.

Figure 1:
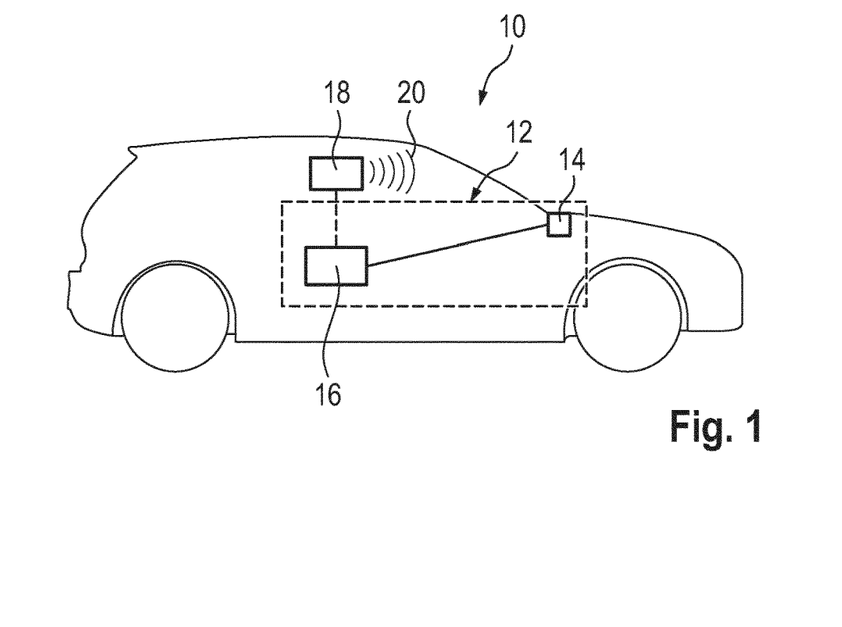
FIG. 1 is a schematic representation of a motor vehicle having a detection device according to some aspects of the present disclosure.

Turning to FIG. 1, the drawing shows a schematic representation of a motor vehicle 10 with a detection device 12 according to some aspects of the present disclosure. In this example, the detection device 12 is designed to provide a current brightness value relating to an ambient brightness. The detection device 12 comprises at least one brightness sensor 14 and an evaluation device 16. Using the at least one brightness sensor 14, current raw brightness values can be repeatedly detected and made available to the evaluation device 16 for further processing. In this example, only a single brightness sensor 14 is shown as an example, but the motor vehicle 10 can also include a plurality of such brightness sensors 14 as part of the detection device 12. Cameras of motor vehicle 10 can also be used as brightness sensors 14. The evaluation device 16 may be configured to carry out a smoothing and situational gradient limitation of the raw value of the brightness sensor 14, as will be explained in more detail below with regard to FIG. 2.

In this example, the current ambient brightness is initially measured using the brightness sensor 14 installed in or on the vehicle 10. Furthermore, the measured value is first smoothed by means of the evaluation device 16 in order to compensate for fluctuations in the signal, and the smoothed signal is then gradient-limited in such a way that an increase to a brighter environment is undertaken more quickly than a decrease to a darker environment. This has an advantage in that influences from driving through tunnels or bridges or other driving situations can be filtered out. This is particularly advantageous if the current brightness value provided in this way is used to detect drowsiness, for example. For this purpose, as illustrated in FIG. 1, the output device 16 can transmit the current brightness value provided in this way to a drowsiness detection system 18 of the motor vehicle 10 which can determine a descriptive variable for a current drowsiness of the driver as a function of the transmitted current brightness value and compare it with a threshold value. If this threshold value is exceeded, a warning signal 20 can be issued by the drowsiness detection system 18.

Figure 2:
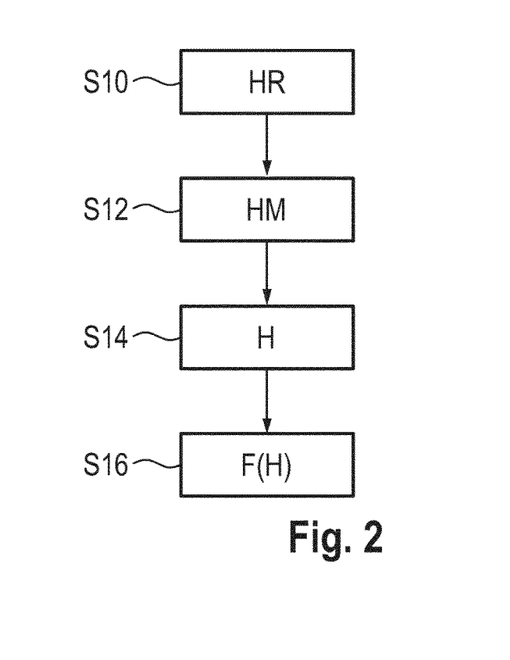
FIG. 2 is a flowchart illustrating a method for providing a current brightness value representing a current ambient brightness according to some aspects of the present disclosure.

FIG. 2 shows a flowchart to illustrate a method for providing a current brightness value relating to an ambient brightness according to some aspects of the present disclosure. The method begins in step S10, in which at least one brightness sensor 14 provides a raw brightness value HR. If a plurality of brightness sensors 14 are provided, the respective detected raw brightness values HR, which can be assigned to the same time step, can also be averaged and then provided as a mean raw brightness value HR in step S10. This raw brightness value HR provided in step S10 is subjected to an averaging in the subsequent step S12. In this averaging, the currently detected raw brightness value HR can be averaged together with at least one previously detected raw brightness value HR or with a variable determined therefrom, such as the previously provided brightness value H, in particular according to a weighted averaging. Above all, exponential smoothing has proven to be a particularly simple and efficient averaging method. A current mean brightness value HM is provided as the result of this averaging. If this mean brightness value is provided according to exponential smoothing, it is calculated as follows:

$$HM(t_n)=a\,HR(t_n)+(1-a)H(t_{n-1})$$

where $HM(t_n)$ represents the mean brightness value at the current point in time $t_n$, $HR(t_n)$ represents the raw brightness value HR provided by the brightness sensor 14 at the current point in time $t_n$, and $H(t_{n-1})$ is the brightness value H determined in the previous time step $t_{n-1}$, a is the weighting factor for which $0 \le a \le 1$ applies, a is preferably greater than 0.5 and is particularly preferably close to 1, since this makes it possible to avoid excessive smoothing, which has a disadvantageous effect on the subsequent gradient limitation. During the initialization of the method, in which no previously determined brightness values H are available, the raw brightness value HR determined at time to can be set equal to the current brightness value H, which means that the following applies:

$$HR(t_0)=H(t_0).$$

This mean brightness value HM provided in this way is now further subjected to a gradient limitation in step S14. The current brightness value H ultimately provided is the result of this gradient limitation. According to this gradient limitation, a deviation of the current mean brightness value HM from at least one previously provided brightness value H, in particular from the brightness value H provided in the immediately preceding time step $t_{n-1}$, is limited to at least one maximum permissible amount if this deviation of the current mean brightness value HM from the previously provided brightness value H is greater than this maximum permissible amount. It is also preferred that this gradient limitation is carried out asymmetrically, i.e., that the limitation takes place to different extents depending on whether the current mean brightness value is greater or less than the previously provided brightness value H.

In this example, two different maximum permissible amounts can therefore be defined depending on whether there is an upward deviation above or a downward deviation below the previous brightness value H. If the current mean brightness value HM is greater than the previously determined brightness value H, the limitation is less pronounced and the maximum permissible amount relative to the deviation is greater than in the case in which the current mean brightness value HM is less than the previously provided brightness value H. This type of gradient limitation thus illustrates the special feature that the reaction to brightness is faster than the reaction to darkness. In other words, increasing darkness is learned only slowly from the brightness values H provided in this way. Driving events such as driving into a tunnel can thus be advantageously filtered out since such events play no part in the drowsiness detection. According to the asymmetric gradient limitation, the current brightness value $H(t_n)$ at the current point in time $t_n$ results as follows from the current mean brightness value $HM(t_n)$ at the current point in time $t_n$:

If $HM(t_n) > H(t_{n-1})$, i.e., if the current mean brightness value HM is greater than the brightness value H last provided:

$$H(t_n)=HM(t_n) \text{ if } |HM(t_n)-H(t_{n-1})| \le \Delta\mathbf{1}$$

$$H(t_n)=H(t_{n-1})+\Delta\mathbf{1} \text{ if } |HM(t_n)-H(t_{n-1})| > \Delta\mathbf{1}$$

where $\Delta 1$ represents a defined first maximum permissible amount.

If $HM(t_n) < H(t_{n-1})$, i.e., if the current mean brightness value HM is less than the brightness value last provided or equal to the brightness value H last provided:

$$H(t_n)=HM(t_n) \text{ if } |HM(t_n)-H(t_{n-1})| \le \Delta 2$$

$$H(t_n)=H(t_{n-1})-\Delta 2 \text{ if } |HM(t_n)-H(t_{n-1})| > \Delta 2$$

where $\Delta 2$ represents a defined second maximum permissible amount.

Preferably $\Delta 1 \ne \Delta 2$, and in particular $\Delta 1 > \Delta 2$. For example, the first maximum permissible amount $\Delta 1$ can be defined to be twice as much, three times as much or four times as much as the second maximum permissible amount $\Delta 2$.

Following the gradient limitation, the current brightness value H provided in this way can be provided to a driver assistance system in step 16, such as the drowsiness detection system mentioned, so that a vehicle function F(H) can be executed or controlled as a function of the current brightness value H. In the case of the drowsiness detection system, as already mentioned regarding FIG. 1 a descriptive variable reflecting the current drowsiness level of the driver, in particular which takes into account further influencing variables, can be determined and can issue a corresponding warning signal 20 if, based on this descriptive variable, it is established that the driver is very tired. Providing the brightness values H as described above makes it possible, above all, to significantly reduce false triggering and false notification by such a drowsiness warning system.

The method described then continues in step S10 for the next time step. In particular, this method can be carried out repeatedly during the entire operation of the motor vehicle 10 or only when the drowsiness detection system has been activated according to a setting selected by the driver.

Figure 3:
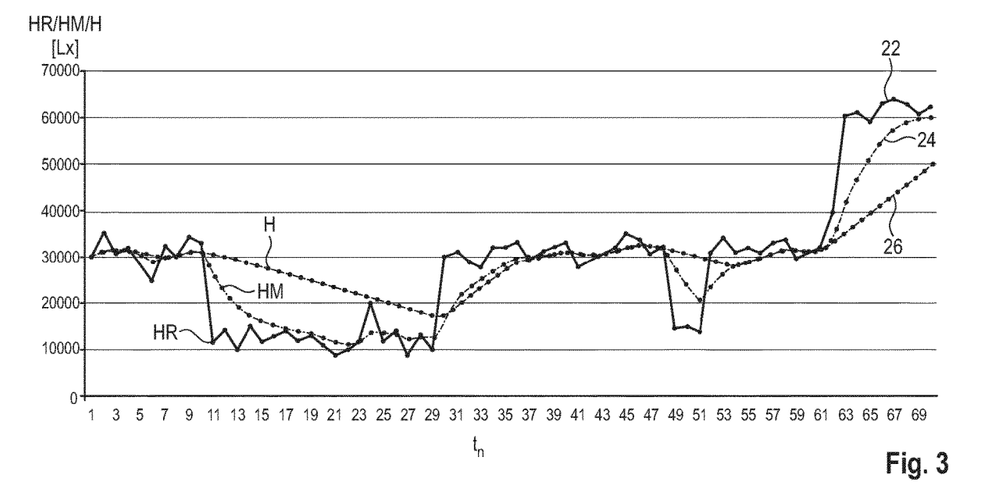
FIG. 3 is a graphic illustration of the raw brightness values, the mean brightness values provided, and the current brightness values calculated therefrom over time in accordance with some aspects of the present disclosure.

FIG. 3 shows a graphic illustration of detected raw brightness values HR, brightness mean values HM calculated therefrom and the gradient-limited brightness values H ultimately provided therefrom over the course of time t. The time steps $t_n$ are correspondingly plotted on the x-axis and the raw brightness values HR, the mean brightness values HM and the brightness values H are plotted on the y-axis in units of lux. Furthermore, the curve on which the raw brightness values HR lie is denoted by 22, the curve of the mean brightness values HM is denoted by 24, and the curve of the brightness values H is denoted by 26. For reasons of clarity, only one brightness raw value HR, one brightness mean value HM and one brightness value H are provided with a reference sign per curve.

The raw brightness values HR show, for example, that at around the $11^{th}$ time step $t_{11}$, the ambient brightness decreases abruptly. From this time step forward, the brightness remains more or less constant at this dark level until about the $29^{th}$ time step $t_{29}$. On the one hand, it can also be clearly seen that the curve of the mean brightness values 24 in this area is subject to significantly fewer fluctuations than the curve 22 of the raw brightness values HR. This is due to the fact that the averaging described has a smoothing effect. Furthermore, it can be seen particularly clearly in this area that the curve 26 of the current brightness values H hardly reacts to this abrupt darkening at all, in particular it is adapted much more slowly to this decreasing brightness than, for example, the curve 24 of the mean brightness values.

The situation is different beginning at the $29^{th}$ time step at which the ambient brightness increases again abruptly, which can again be seen from the curve 22 of the raw brightness values HR. In this case, curve 26 of the brightness values H also follows this increase much faster, in particular almost as quickly as the curve 24 of the mean brightness values. This profile between the $11^{th}$ and $29^{th}$ time steps corresponds approximately to a tunnel driving scenario. The influence of such a tunnel journey can be filtered out very well by the described calculation of the brightness values H. An adjustment to long-term changes, such as the day-night change in brightness, can still be followed without any problems.

Overall, the examples show how the invention can provide a method for determining the estimated daytime brightness according to which the influence of temporary driving scenarios on the brightness values currently determined can be filtered out, the filtering out being accomplished by a gradient limitation and in a particularly advantageous manner by using the special feature that the reaction to brightness is faster than the reaction to darkness. This method therefore goes far beyond pure smoothing of the signal from the brightness sensor and enables significantly better situational adaptation to numerous other situations that have not yet been considered.

LIST OF REFERENCE SIGNS

10 Motor vehicle
12 Detection device
14 Brightness sensor
16 Evaluation device
18 Drowsiness detection system
20 Warning signal
22 Curve of raw brightness values
24 Curve of mean brightness values
26 Curve of brightness values
H Brightness value
HM Mean brightness value
HR Raw brightness value
F(H) Vehicle function
$t_n$ Time step
S10 Step
S12 Step
S14 Step
S16 Step

The invention claimed is:

1. A method for providing a current brightness value relating to an ambient brightness, comprising:
   detecting, via at least one brightness sensor, at least one first raw brightness value at a first time and at least one second raw brightness value at a second time subsequent to the first time;
   generating a current mean brightness value by averaging the at least one second raw brightness value and the at least one first raw brightness value;
   determining that a deviation of the current mean brightness value from at least one previously provided brightness value during a preceding time step is greater than an at least one maximum permissible amount;
   executing a gradient limitation for the current mean brightness value, wherein the gradient limitation is iteratively applied to limit the deviation of the current mean brightness value from the at least one previously provided brightness value, thereby filtering transient changes in ambient brightness; and
   generating a current brightness value that represents an adjusted ambient brightness, based on the executed gradient limitation.

2. The method according to claim 1, wherein executing the gradient limitation comprises executing an asymmetrical gradient limitation, wherein the deviation of the current mean brightness value from the at least one previously provided brightness value is limited to a first maximum permissible amount if the current mean brightness value is greater than the at least one previously provided brightness value.

3. The method according to claim 2, wherein the deviation of the current mean brightness from the at least one previously provided brightness value is limited to a second maximum permissible amount, if the current mean brightness is less than the at least one previously provided brightness value, the first amount is different from the second amount.

4. The method according to claim 3, wherein the first amount is greater than the second amount.

5. The method according to claim 1, wherein the at least one previously provided brightness value represents the brightness value provided during the preceding time step.

6. The method according to claim 1, wherein the averaging of the at least one second raw brightness value and the at least one first raw brightness value comprises one of (i) a weighted averaging, or (ii) an exponential smoothing.

7. The method according to claim 1, further comprising controlling at least one motor vehicle function based on the generated current brightness value that represents the adjusted ambient brightness, wherein the at least one motor vehicle function comprises a function other than a headlight function of a motor vehicle.

8. The method according to claim 7, wherein the at least one motor vehicle function comprises a drowsiness detection system, and further comprising determining a current variable describing a drowsiness of the driver of the motor vehicle as a function of the current brightness value, and generating a warning to the driver as a function of the current variable.

9. An apparatus for providing a current brightness value relating to an ambient brightness, comprising:
   at least one brightness sensor configured to detect at least one first raw brightness value at a first time and at least one second raw brightness value at a second time subsequent to the first time; and
   an evaluation unit, operatively coupled to the at least one brightness sensor, wherein the evaluation unit is configured to generate a current mean brightness value by averaging the at least one second raw brightness value and the at least one first raw brightness value, wherein the evaluation unit is configured to determine that a deviation of the current mean brightness value from at least one previously provided brightness value during a preceding time step is greater than an at least one maximum permissible amount, and wherein the evaluation unit is configured to execute a gradient limitation for the current mean brightness value, wherein the gradient limitation is iteratively applied to limit the deviation of the current mean brightness value from the at least one previously provided brightness value, thereby filtering transient changes in ambient brightness; and generating a current brightness value based on the executed gradient limitation.

10. The apparatus according to claim 9, wherein the evaluation unit is configured to execute the gradient limitation by executing an asymmetrical gradient limitation, wherein the deviation of the current mean brightness value from the at least one previously provided brightness value is limited to a first maximum permissible amount if the current mean brightness value is greater than the at least one previously provided brightness value.

11. The apparatus according to claim 10, wherein the deviation of the current mean brightness from the at least one previously provided brightness value is limited to a second maximum permissible amount, if the current mean brightness is less than the at least one previously provided brightness value, the first amount is different from the second amount.

12. The apparatus according to claim 11, wherein the first amount is greater than the second amount.

13. The apparatus according to claim 9, wherein the at least one previously provided brightness value represents the brightness value provided during the preceding time step.

14. The apparatus according to claim 9, wherein the evaluation unit is configured to average the at least one second raw brightness value and the at least one first raw brightness value by utilizing one of (i) a weighted averaging, or (ii) an exponential smoothing.

15. The apparatus according to claim 9, wherein the evaluation unit is configured to generate a control signal for controlling at least one motor vehicle function based on the generated current brightness value that represents the adjusted ambient brightness, wherein the at least one motor vehicle function comprises a function other than a headlight function of a motor vehicle.

16. The apparatus according to claim 15, wherein the at least one motor vehicle function comprises a drowsiness detection system, configured to determine a current variable describing a drowsiness of the driver of the motor vehicle as a function of the current brightness value, and generating a warning to the driver as a function of the current variable.

17. A method for providing a current brightness value relating to an ambient brightness, comprising:

detecting, via at least one brightness sensor, at least one first raw brightness value at a first time and at least one second raw brightness value at a second time subsequent to the first time;

generating a current mean brightness value by averaging the at least one second raw brightness value and the at least one first raw brightness value;

determining that a deviation of the current mean brightness value from at least one previously provided brightness value during a preceding time step is greater than an at least one maximum permissible amount;

executing a gradient limitation for the current mean brightness value, wherein the gradient limitation is iteratively applied to limit the deviation of the current mean brightness value from the at least one previously provided brightness value thereby filtering transient changes in ambient brightness;

generating a current brightness value that represents an adjusted ambient brightness, based on the executed gradient limitation; and controlling at least one motor vehicle function based on the generated current brightness value.

18. The method according to claim 17, wherein executing the gradient limitation comprises executing an asymmetrical gradient limitation, wherein the deviation of the current mean brightness value from the at least one previously provided brightness value is limited to a first maximum permissible amount if the current mean brightness value is greater than the at least one previously provided brightness value.

19. The method according to claim 18, wherein the deviation of the current mean brightness from the at least one previously provided brightness value is limited to a second maximum permissible amount, if the current mean brightness is less than the at least one previously provided brightness value, the first amount is different from the second amount.

20. The method according to claim 17, wherein the averaging of the at least one second raw brightness value and the at least one first raw brightness value comprises one of (i) a weighted averaging, or (ii) an exponential smoothing.

* * * * *